United States Patent
Wang et al.

(10) Patent No.: US 11,659,542 B2
(45) Date of Patent: May 23, 2023

(54) SCHEDULING OF A DATA TRANSMISSION

(71) Applicant: Telefonaktiebolaget LM Ericsson (publ), Stockholm (SE)

(72) Inventors: Yu Wang, Solna (SE); Luis Felipe Del Carpio Vega, Espoo (FI); Divya Peddireddy, Gothenburg (SE); Zhenhua Zou, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/770,237

(22) PCT Filed: Dec. 14, 2017

(86) PCT No.: PCT/EP2017/082843
§ 371 (c)(1),
(2) Date: Jun. 5, 2020

(87) PCT Pub. No.: WO2019/114971
PCT Pub. Date: Jun. 20, 2019

(65) Prior Publication Data
US 2020/0383126 A1    Dec. 3, 2020

(51) Int. Cl.
*H04W 72/121* (2023.01)
*H04W 72/50* (2023.01)
(Continued)

(52) U.S. Cl.
CPC ..... *H04W 72/121* (2013.01); *H04W 72/0446* (2013.01); *H04W 72/1263* (2013.01); *H04W 72/535* (2023.01); *H04W 80/02* (2013.01)

(58) Field of Classification Search
CPC ... H04L 5/0053; H04L 5/0055; H04L 5/0057; H04W 72/1284; H04W 74/006
See application file for complete search history.

(56) References Cited

U.S. PATENT DOCUMENTS

| | | | |
|---|---|---|---|
| 10,397,972 B2 * | 8/2019 | Jung | H04W 76/15 |
| 2007/0030839 A1 * | 2/2007 | Vimpari | H04W 28/06 |
| | | | 370/342 |

(Continued)

FOREIGN PATENT DOCUMENTS

CN    104052562 A    9/2014

OTHER PUBLICATIONS

PCT International Search Report and Written Opinion, dated Aug. 14, 2018, for International Application PCT/EP2017/082843, 10 pages.

(Continued)

*Primary Examiner* — Khaled M Kassim
*Assistant Examiner* — Berhanu D Belete
(74) *Attorney, Agent, or Firm* — Sage Patent Group (57) ABSTRACT

A method of scheduling data transmission of a group of wireless devices, in a wireless communication network, comprising:
determining a relative transmission timing relation between a reference wireless device out of the group of wireless devices and at least one wireless device out of the group of wireless devices; and
scheduling the data transmission of the at least one wireless devices based on the indicated relative transmission timing relation in response to a scheduling request.

14 Claims, 5 Drawing Sheets

(51) Int. Cl.
  *H04W 72/0446* (2023.01)
  *H04W 72/1263* (2023.01)
  *H04W 80/02* (2009.01)

(56) References Cited

U.S. PATENT DOCUMENTS

| | | | | |
|---|---|---|---|---|
| 2008/0031172 | A1* | 2/2008 | Nanda | H04W 72/0426 |
| | | | | 370/310.1 |
| 2008/0113636 | A1* | 5/2008 | Kikuchi | H04B 1/7117 |
| | | | | 375/E1.032 |
| 2012/0281681 | A1* | 11/2012 | Hsu | H04W 4/08 |
| | | | | 370/336 |
| 2013/0150109 | A1 | 6/2013 | Takano | |
| 2013/0191544 | A1* | 7/2013 | Caldeira de Andrada | |
| | | | | H04L 67/325 |
| | | | | 709/226 |
| 2013/0242825 | A1* | 9/2013 | Farhadi | H04W 72/121 |
| | | | | 370/312 |
| 2013/0258953 | A1 | 10/2013 | Huang et al. | |
| 2014/0269757 | A1* | 9/2014 | Park | H04N 21/4305 |
| | | | | 370/432 |
| 2015/0018010 | A1* | 1/2015 | Fischer | H04W 64/00 |
| | | | | 455/456.2 |
| 2015/0085836 | A1* | 3/2015 | Kang | H04W 74/0808 |
| | | | | 370/336 |
| 2015/0092566 | A1* | 4/2015 | Balachandran | H04W 52/50 |
| | | | | 370/242 |
| 2015/0296359 | A1* | 10/2015 | Edge | G01S 1/20 |
| | | | | 455/404.2 |
| 2015/0318969 | A1* | 11/2015 | Morioka | H04W 72/0446 |
| | | | | 370/336 |
| 2016/0057718 | A1* | 2/2016 | Sorrentino | H04W 56/002 |
| | | | | 370/350 |
| 2016/0119810 | A1* | 4/2016 | Merlin | H04W 28/0231 |
| | | | | 370/336 |
| 2016/0211996 | A1* | 7/2016 | Mittelsteadt | H04L 27/26 |
| 2016/0286461 | A1* | 9/2016 | Patil | H04W 40/32 |
| 2016/0345316 | A1* | 11/2016 | Kazmi | H04W 72/0446 |
| 2016/0360474 | A1* | 12/2016 | Arzelier | H04W 12/02 |
| 2016/0365959 | A1* | 12/2016 | Dinan | H04L 5/0055 |
| 2017/0273044 | A1* | 9/2017 | Alsina | G06F 3/165 |
| 2018/0110047 | A1* | 4/2018 | Babaei | H04W 72/0446 |
| 2018/0359631 | A1* | 12/2018 | Balachandran | H04W 8/22 |
| 2019/0007951 | A1* | 1/2019 | Kwak | H04W 4/70 |
| 2019/0007962 | A1* | 1/2019 | Arshad | H04W 56/0045 |
| 2019/0028980 | A1* | 1/2019 | Feuersaenger | H04W 52/281 |
| 2019/0273671 | A1* | 9/2019 | Alcala Perez | H04L 43/08 |
| 2019/0313355 | A1* | 10/2019 | Alsina | H04N 21/4307 |
| 2020/0008186 | A1* | 1/2020 | Kim | H04W 72/042 |
| 2020/0213059 | A1* | 7/2020 | Dinan | H04W 74/0833 |
| 2020/0329488 | A1* | 10/2020 | Dinan | H04L 5/0053 |

OTHER PUBLICATIONS

China Unicom, 3GPP TSG SA WG2 Meeting #86, TD S2-102330, "Time Control According to MTC Device Identifiers", Kyoto, Japan, May 10-14, 2010, 3 pages.

Ericsson et al., 3GPP TSG RAN Meeting #76, RP-171489, "Revised Work Item on Ultra Reliable Low Latency Communication for LTE", West Palm Beach, USA, Jun. 5-8, 2017, 5 pages.

First Chinese Office Action for Chinese Patent Application No. CN 201780097695.1 dated Dec. 26, 2022, 11 pages (including English translation).

* cited by examiner

| IE_ID | num_element | ID_0 | ID_1 | timing_min_1 | timing_max_1 | ID_2 | timing_min_2 | timing_max_2 | ... |

SCHEDULING OF A DATA TRANSMISSION

CROSS-REFERENCE TO RELATED APPLICATIONS

This application is a 35 U.S.C. § 371 national stage application for International Application No. PCT/EP2017/082843, entitled "SCHEDULING OF A DATA TRANSMISSION", filed on Dec. 14, 2017, the disclosures and contents of which are hereby incorporated by reference in their entireties.

TECHNICAL FIELD

The present disclosure generally relates to a technique for scheduling data transmission of a group of wireless devices in a wireless communication network. More specifically, methods and devices are provided for scheduling data transmission of a group of wireless devices in a wireless communication network.

BACKGROUND

Machine-to-Machine communication is one aspect in a future factory automation or smart grid scenario to control and monitor signaling between different machines and sensors. This communication is often critical in view of a combined requirement of low latency and high reliability, such as a loss ratio of $10^{-5}$ within 1 millisecond. One characteristic in these machine-to-machine (M2M) or machine-type communication (MTC) is that data is generated periodically and shortly after data generation, radio resources are scheduled to transmit the data to meet the strict latency requirement. Thus, critical data generation and transmission scheduling are usually tightly coordinated. Radio systems designed to serve such critical transmissions are referred to as URLLC (Ultra Reliably Low Latency Communication) in NR (new Radio) or HRLLC (High Reliability Low Latency Communication) in LTE (Long Term Evolution) as part of 3GPP's $5^{th}$ generation communication system solutions (5G) to the International Telecommunication Union (ITU).

One possible use case is the management of one or multiple sensors which could be attached to a machine in a factory environment. Further, said machine may interact with other machines. Depending on the operation of the machines, the data sampling of the sensors follows certain order and intervals. For example, a movement of a first machine triggers the motion of a second machine which opens a valve. The operations must be monitored with very low latency so that proper responses can be determined. The critical data generation from motion sensors will follow the order of the first machine, the second machine and the valve with short intervals. Therefore, the uplink transmissions of the sensors to the communication network and downlink transmission from the communication network to the machines must be scheduled in the same order in time so that the work cycle will not be stunted.

Figure 1:
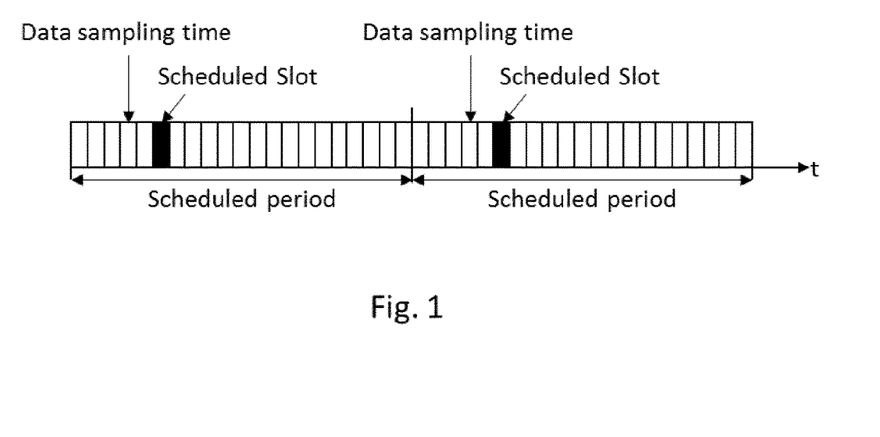
FIG. 1 shows a schematic illustration of an example of a time slotted frame structure.

To deliver the low latency, deterministic periodic scheduling is usually applied as shown in FIG. 1. This figure provides an example of a scheduling of critical traffic in a time slotted URLLC system. One example of a time slotted system is a TDM (Time Division Multiplex) system. In the example of FIG. 1 two scheduling periods are shown. In such systems, a scheduled time slot is pre-allocated to one critical transmission every certain period. In the example of FIG. 1, the $6^{th}$ time slot in each scheduling period is allocated to a transmission of data. The data sampling entity is coordinated with the radio system so that the data generation (data sampling time) is shortly before the scheduled transmission time. Then the latency between the data generation and the data transmission is controlled within a short interval.

Figure 2:
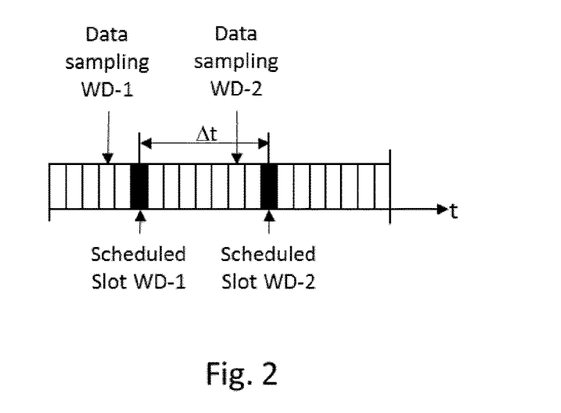
FIG. 2 shows a schematic illustration of a sequential scheduling example in a time slotted frame structure.

The critical data transmissions of physically-coupled sensors impose new requirements on radio resource scheduling, i.e. the order and interval of scheduling within one scheduling period. As shown in FIG. 2, the data sampling of two wireless devices or sensors, WD-1 and WD-2, must be in a strict sequential order and separated with short intervals in time.

SUMMARY

It is an object of the present invention to improve the scheduling of radio resources in wireless communication system. This object is achieved by the independent claims. Advantageous embodiments are described in the dependent claims.

According to a first aspect, a method of scheduling data transmission of a group of wireless devices in a wireless communication network is provided. The method comprises the steps of determining a relative transmission timing relation between a reference wireless device out of the group of wireless devices and at least one wireless device out of the group of wireless devices, and scheduling the data transmission of the at least one wireless device based on the indicated relative transmission timing relation in response to a scheduling request.

According to a further aspect, a controller in a wireless communication network is provided. The controller is configured to calculate, based on relative transmission timing requirements between a wireless device of a group of wireless devices and another wireless device of said group of wireless devices, the minimum and maximum relative transmission timing relation between a reference wireless device out of said group of wireless devices and each of the wireless device out of said group of wireless devices. The controller is further configured to initiate transmission of the minimum and maximum relative transmission timing relations of each of the wireless devices out of said group of wireless devices to a scheduler in the wireless communication system.

According to a further aspect, a controller in a wireless communication network is provided. The controller comprises a processor and a memory, said memory contains instructions executable by said processor, whereby said controller is operative to calculate, based on relative transmission timing requirements between a wireless device of a group of wireless devices and another wireless device of said group of wireless devices, the minimum and maximum relative transmission timing relation between a reference wireless device out of said group of wireless devices and each of the wireless device out of said group of wireless devices, and to initiate transmission of the minimum and maximum relative transmission timing relations of each of the wireless devices out of said group of wireless devices to a scheduler in the wireless communication system.

According to a further aspect, a wireless device out of a group of wireless devices in a wireless communication network is provided. The wireless device is configured to determine a relative transmission timing requirement between said wireless device and another wireless device out of the group of wireless devices, and to send the relative transmission timing requirement to a controller in the wireless communication network for determining a relative transmission timing relation between a reference wireless device out of the group of wireless devices and said wireless device.

According to a further aspect, a wireless device out of a group of wireless devices in a wireless communication network is provided. The wireless device comprises a processor and a memory, said memory contains instructions executable by said processor, whereby said wireless device is operative to determine a relative transmission timing requirement between said wireless device and another wireless device out of the group of wireless devices, and to send the relative transmission timing requirement to a controller in the wireless communication network for determining a relative transmission timing relation between a reference wireless device out of the group of wireless devices and said wireless device.

According to a further aspect, a scheduler for scheduling data transmission between at least one wireless devices out of a group of wireless devices and a wireless communication system is provided. The scheduler is configured to schedule the data transmission to or from said at least one wireless device out of the group of wireless devices based on an indicated relative transmission timing relation between a reference wireless device out of the group of wireless devices and said at least one wireless device out of the group of wireless devices in response to a scheduling request.

According to a further aspect, a scheduler for scheduling data transmission between at least one wireless devices out of a group of wireless devices and a wireless communication system is provided. The scheduler comprises a processor and a memory, said memory contains instructions executable by said processor, whereby said scheduler is operative to schedule the data transmission to or from said at least one wireless device out of the group of wireless devices based on an indicated relative transmission timing relation between a reference wireless device out of the group of wireless devices and said at least one wireless device out of the group of wireless devices in response to a scheduling request.

The present invention also concerns computer programs comprising portions of software codes or instructions in order to implement the method as described above when operated by at least one respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals. The present invention also concerns a carrier containing said computer program. Said carrier is one of an electronic signal, optical signal, radio signal, magnetic tape, CD-ROM, DVD, Bluray disc, etc. . . . .

BRIEF DESCRIPTION OF THE FIGURES

In the following, the invention will further be described with reference to exemplary embodiments illustrated in the figures, in which.

DETAILED DESCRIPTION

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with LTE or NR standard terminology to illustrate the present invention, they are equally applicable to other kinds of mobile communication systems. Also, the invention may be practiced in any network to which wireless devices may attach. For example, the present invention is applicable to, besides cellular networks, Local Area Networks (LANs), Wireless LANs (WLANs), or similar wireless networks, but also to wireline networks such as, for example, the intranet of a company, a factory or the Internet.

Those skilled in the art will further appreciate that the functions explained herein below may be implemented using hardware circuitry, software means, or a combination thereof. The software means may be in conjunction with a programmed microprocessor or a general-purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Within the context of the present application, the term wireless device (WD) refers to a device preferred to be exemplified by a sensor type device, e.g. attached to a machine for the communication of monitoring and control messages. IT may also be a device to be used by a person for his or her personal communication. The wireless device can be a user equipment or a sensor in a factory. It can be a telephone type of device, for example a telephone or a SIP phone, cellular telephone, a mobile station, cordless phone, or a personal digital assistant type of device like laptop, notebook, notepad equipped with a wireless data connection. The WD may also be associated with non-humans like animals, plants, or machines. A WD may be equipped with a SIM (Subscriber Identity Module) comprising unique identities such as IMSI (International Mobile Subscriber Identity) and/or TMSI (Temporary Mobile Subscriber Identity) associated with a subscriber using the WD. The presence of a SIM within a WD customizes the WD uniquely with a subscription of the subscriber.

Within the context of the present application, the term "wireless communication network" or short "communication network" or "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G, GSM, 3G, WCDMA, CDMA, 4G (LTE), WLAN, Wi-Fi or 5G (New Radio), mobile backhaul network, or core network such as IMS, CS Core, PS Core.

The illustration in the drawing is schematic. In different drawings, similar or identical elements are provided with the same reference signs or with reference signs which are different from one another in the first digit.

According to an embodiment a method of scheduling data transmission of a group of wireless devices is provided. The data transmission could be a data transmission from the wireless device to an access node of a wireless communication network, which can also be denoted as uplink data transmission. In one example the group of wireless devices is a group of sensors, wherein each sensor is able to send data over an air interface to an access point of a network. The access point could be an enhanced Node B of an LTE network or a gNode B of a new radio access network or any other access node. All these sensors sense data, like temperature, humidity, positions of actors or any other parameter which could be sensed (e.g. in a factory). These data must be provided in a fast and reliable manner to a server or node to enable e.g. a fast reaction of a machine or actor. To handle this uplink transmission requests, the method comprises the step of determining a relative transmission timing relation between a reference wireless device out of the group of wireless devices and at least one wireless device out of the group of wireless devices. One of the sensors is defined as a reference sensor and the relative transmission timing relation is determined in relation to said reference wireless device. The reference device could be a sensor with the highest priority data in view of security issues—like a sensor which is able to detect events which may have the highest impact to a production process in a factory. The reference wireless device may also be the wireless device with the highest amount of data to be provided. The reference wireless device could also be selected based on a random selection procedure or based on the identity number of the wireless device. The relative transmission timing relation may therefore be related to one reference wireless device for all other wireless devices of said group of wireless devices. According to this embodiment the method further comprises the step of scheduling the data transmission of the at least one wireless device based on the indicated relative transmission timing relation in response to a scheduling request. The advantage is that the critical transmission requirements can be considered when scheduling the transmission to serve URLLC traffic in certain transmission order and interval among multiple wireless devices and nodes. The scheduling request could be an uplink or downlink scheduling request, dependent on direction of the critical communication between the access point of the wireless communication network and the wireless device or group of wireless devices.

If the group of wireless devices comprises only one wireless device then said one wireless device is also the reference wireless device and the relative transmission timing relation is set to zero. According to one example three sensors (IDs=001, 002 and 003) in the group of wireless devices need to provide uplink data to the network successively in the order 001, 002 and 003 with a time difference of 0.1 ms between each of the sensors and the sensor with ID: 001 has been determined as the reference sensor or wireless device, the relative transmission timing relation is:

ID:000, relative timing: 0.00 ms
ID:001, relative timing: 0.01 ms
ID:002, relative timing: 0.02 ms The relative transmission timing relation may be a time period, as explained above, or a number of time slots between a communication event of a reference wireless device and a communication event of at least one wireless device in a time division multiplex, TDM, frame. It may also possible to use a FDM frame on a single subcarrier or on multiple subcarriers.

Figure 3:
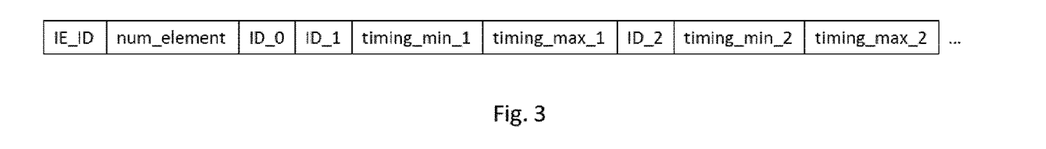
FIG. 3 shows a schematic illustration of an information element according to one embodiment.

According to a further embodiment the scheduling request may comprise an information element and wherein the information element comprises at least an identity of the reference wireless device, a minimum and a maximum relative transmission timing relation between said reference wireless device and the at least one wireless device out of the group of wireless devices. FIG. 3 shows an example of an information element (IE) according to said embodiment. The IE may comprise an identity of said IE (IE_ID) in the first part of the IE. Further the IE may comprise an information about the number of wireless devices of a group of wireless devices to be scheduled (num_element). The next part of the IE may comprise the identity of the reference wireless device without any further timing information. The next part of the IE may contain all further identities of the wireless devices from said group of wireless devices (ID_1, ID_2, . . . ) and their respective minimum and maximum relative timing relations in relation to the reference wireless device. The identity of the reference wireless device may be an IP address, MAC address or bearer ID. The minimum and maximum relative transmission timing relations define, for each wireless device, a transmission window to provide a range of acceptable intervals with respect to the scheduled time of the reference wireless device. This may add some freedom for scheduling the transmissions of all wireless devices in a radio frame.

According to a further embodiment, the minimum and maximum relative transmission timing relation between the reference wireless device and the at least one wireless device is determined by receiving from each wireless device out of the group of wireless devices a relative transmission timing requirement between said wireless device and another wireless device out of the group of wireless devices, and calculating, based on the received relative transmission timing requirements the minimum and maximum relative transmission timing relation between the reference wireless device and each of the wireless device out of the group of wireless devices. Each wireless device may know specific transmission requirements for its data in relation to another specific device. In one example a sensor is aware of the need to provide its sensor data to the network a specific time before another sensor provides its data to the network. This information is used to calculate all relative transmission timing relations of all wireless devices out of the group of wireless devices. An advantage of this method is that each wireless device out of the group of the wireless devices does not need to know all transmission relations to all other wireless devices. It is even not necessary for each of the wireless devices to be aware of the reference wireless device. It may also be possible, that the requirements are provided via a manual configuration or via an "Over-the-Top" protocol. According to a further embodiment, the transmission timing relation between the reference wireless device and the at least one wireless device out of the group of wireless devices is determined or calculated by a controller in the wireless communication network. The controller could be part of the wireless communication network as a single node. It may also be possible that the controller is a higher layer entity in the network which can be controlled by an operator. The controller may also be part of an access point in the wireless communication system. The controller may also be located as a function in the scheduler or may be a distributed function in a cloud environment.

Figure 4:
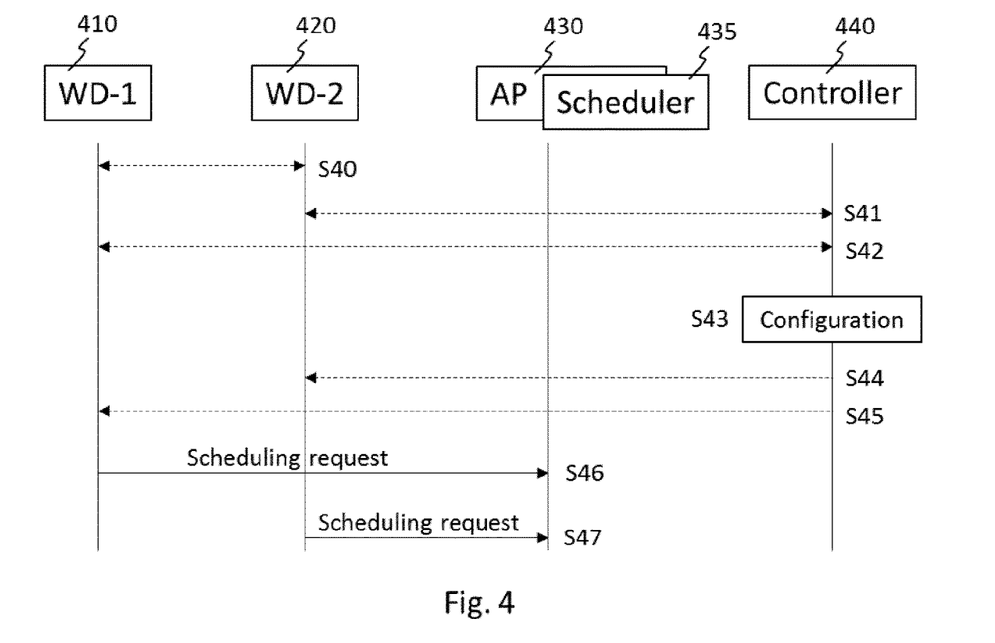
FIG. 4 shows an alternative exemplary sequence diagram according to a first embodiment.
Figure 5:
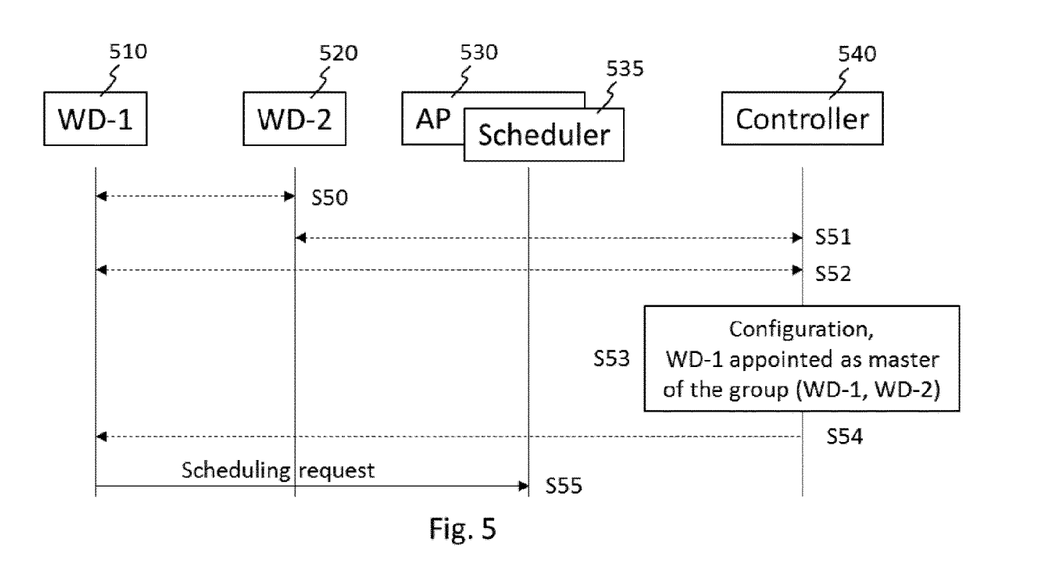
FIG. 5 shows an alternative exemplary sequence diagram according to a second embodiment.
Figure 6:
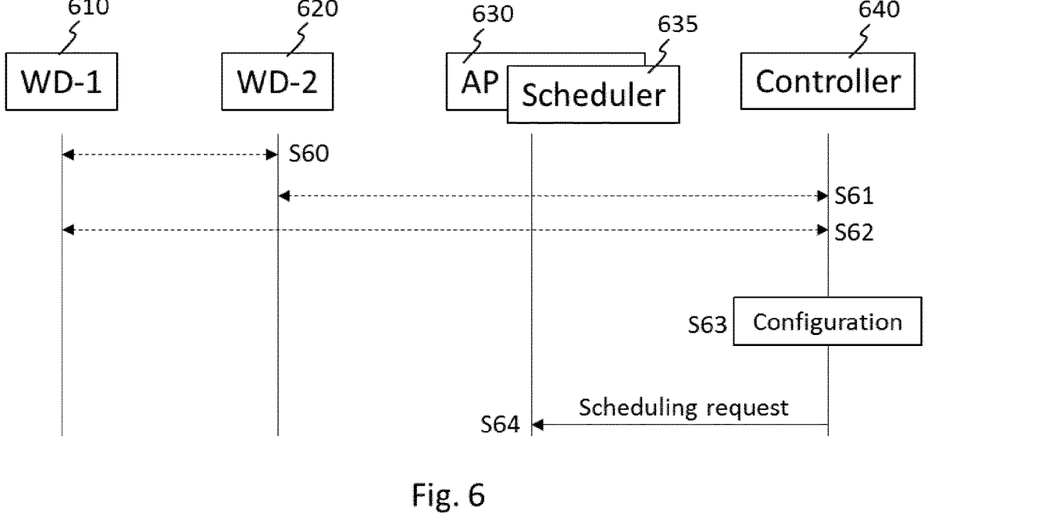
FIG. 6 shows an alternative exemplary sequence diagram according to a third embodiment.

In the following, FIGS. 4 to 6 show different embodiments. In these figures the access point AP 430, 530, 630 is depicted to which messages are sent. Further a scheduler 435, 535, 635 is depicted in all figures as one part or one function of the access point AP 430, 530, 630. The scheduling requests from the different nodes is therefore provided to the scheduler 1000 via the access points 430, 530, 630. The scheduler 435, 535, 635 may also be located elsewhere in the wireless communication network (e.g. as a function in the core network or as a function in a cloud environment.

FIG. 4 shows an alternative exemplary sequence diagram according to a first embodiment. Two wireless devices WD-1 410 and WD-2 420 are depicted as a group of wireless devices. In a first step the wireless devices WD-1 410 and WD-2 420 may exchange information about their transmission requirements to make sure that both wireless devices 410, 420 are aware of the transmission requirements of its neighbors. If more than two wireless devices are part of a group of wireless devices which should be handled by the scheduler then each wireless device may exchange transmission or reception requirements with all other wireless devices or each wireless device 410, 420 may only exchange information with one other wireless devices out of said group. In the next steps S41 and S42, both wireless devices 410, 420 exchanges relative transmission timing requirement with a controller 440. It may be possible that the controller also sends relative transmission timing requirements to the wireless devices. The controller may then determine and/or calculate in a configuration step S43, based on the received relative transmission timing requirements, relative transmission timing relations between a reference wireless device out of the group of wireless devices 410, 420 and at least one wireless device 410, 420 out of the group of wireless devices. After the minimum and maximum relative transmission timing relations have been calculated for each of the wireless devices WD-1 410 and WD-2 420, the method further comprises the steps S44 and S45 of sending the minimum and maximum relative transmission timing relation between the reference wireless device and the at least one wireless device 410, 420 to said at least another wireless device 410, 420. Each wireless device 410, 420 may only receive the information about the identity of the reference wireless device and its minimum and maximum relative transmission timing relation to said reference wireless device. The reference wireless device may be WD-1 410 or WD-2 420, dependent on specific criteria, explained above. According to a further embodiment, the scheduling request is sent by each wireless device 410, 420 out of the group of wireless devices to at least one scheduler 435 in the wireless communication network in steps S46 and S47. The figure just shows the access point 430 including a scheduler function 435 which is allocated to said AP 430. The information element in each of the scheduling requests comprises one minimum and one maximum relative transmission timing relation between the reference wireless device 410, 420 and said wireless device 410, 420 out of the group of wireless devices. Each wireless device 410, 420 may decide if a scheduling request need to be sent to which access point. In the example of FIG. 4 only one access point AP 430 is mentioned. The main aspect of the embodiment of FIG. 4 is that each wireless device 410, 420 out of the group of wireless devices provides its "own" relative transmission timing requirements via a scheduling request to a respective access point/scheduler in the network. This scenario may be useful if a lot of wireless devices are included in said group of wireless devices which are attached to different access points or schedulers in the network. The scheduler in each access network must therefore be coordinated such that each scheduler is aware of the scheduling of the reference wireless device. It may further be possible that the information about the relative transmission timing requirements are provided by a separate message to a scheduler in the network.

FIG. 5 depicts an alternative exemplary sequence diagram according to a second embodiment. The set-up is comparable to the embodiment of FIG. 4 and the first three steps S50 to S52 are comparable to steps S40 and S42 of the embodiment of FIG. 4. The method according to this embodiment comprises the step of sending the minimum and maximum relative transmission timing relation between the reference wireless device 510, 520 and all wireless devices 510, 520 from said group of wireless devices to a master wireless device 510, 520 out of the group of wireless devices. According to a further aspect the scheduling request is sent by said master wireless device 510, 520 out of the group of wireless devices to an access point 530 in the wireless communication network, and wherein the information element comprises the minimum and the maximum relative transmission timing relation between the reference wireless device and all wireless devices 510, 520 from said group of wireless devices.

According to the embodiment of FIG. 5 the controller 540 may appoint wireless device WD-1 510 as the master wireless device of said group of wireless devices and sends in step S54 the information element which comprises all relative transmission timing requirements of all wireless devices from said group to said master wireless device 510. It may also be possible that another master wireless device is appointed. The master wireless device 510, 520 out of the group of wireless devices may also be the reference wireless device 510, 520. In a next step S55 the master wireless device sends a scheduling request to the access point 530 and scheduler 535 to request data transmission of all wireless devices 510, 520 from the group of wireless devices. It may also be possible to send this so-called group-request to a scheduler with a different message (e.g. via an Over-The-Top message). The advantage of this embodiment of FIG. 5 is that only one scheduling request is used to schedule all wireless devices 510, 520 which result in a reduced resource usage over the air interface. The length of the information element in the scheduling request (or any other message) depends on the size of the group of wireless devices and can explicitly be indicated.

FIG. 6 shows an alternative exemplary sequence diagram according to a third embodiment. The difference between this embodiment and the other two embodiments is that the scheduling request is sent by the controller to an access point in the wireless communication network. Steps S60 to S62 are comparable to steps S40 and S42 of the embodiment of FIG. 4. In step S63 the controller configures the relative transmission timing relations based on the received relative transmission requirements from the wireless devices 610, 620. In a next step S64 the controller provides an information element, comprising all relative transmission timing relations to an access point 630 and the related scheduler 635 of the wireless communication network. This can be done by a scheduling request for scheduling all wireless devices 610, 620 out of said group of wireless devices. This embodiment has the advantage that the wireless devices 610, 620 do not need to provide any scheduling requests to the access point/scheduler and can therefore be less complex. Further, if there are many wireless devices to be scheduled then the number of messages which are sent via the air interface to the access point/scheduler will be reduced which results in less bandwidth need for control messages.

Figure 7:
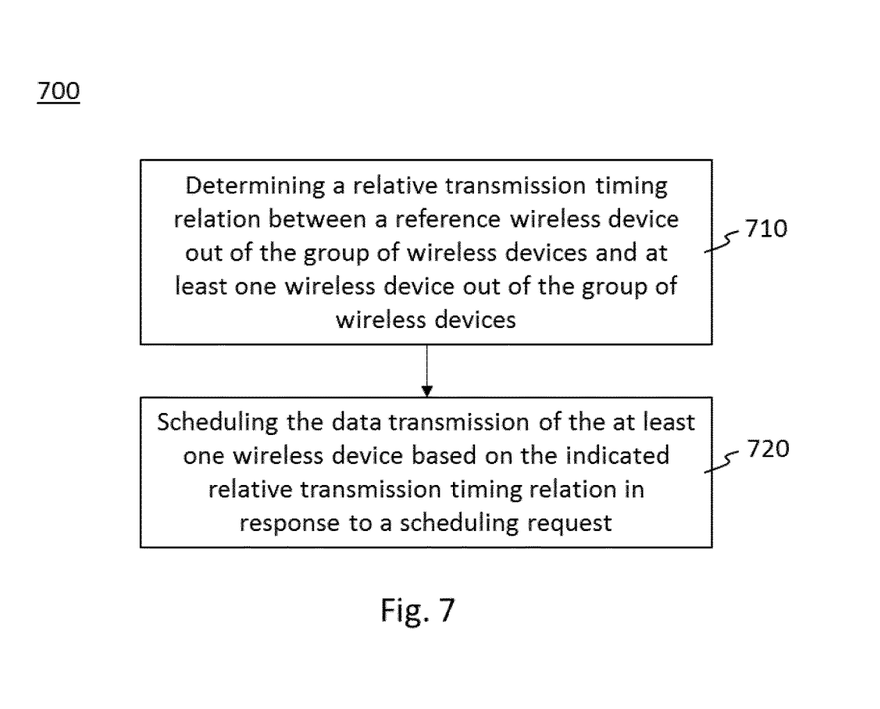
FIG. 7 shows a flow diagram according to one embodiment.

FIG. 7 shows a flow diagram 700 of a method of scheduling data transmission of a group of wireless devices, in a wireless communication network according to one embodiment. In a first step 710, a relative transmission timing relation between a reference wireless device out of the group of wireless devices and at least one wireless device out of the group of wireless devices is determined. In a next step 720 the data transmission of the at least one wireless device is scheduled based on the indicated relative transmission timing relation in response to a scheduling request is scheduled.

Figure 8:
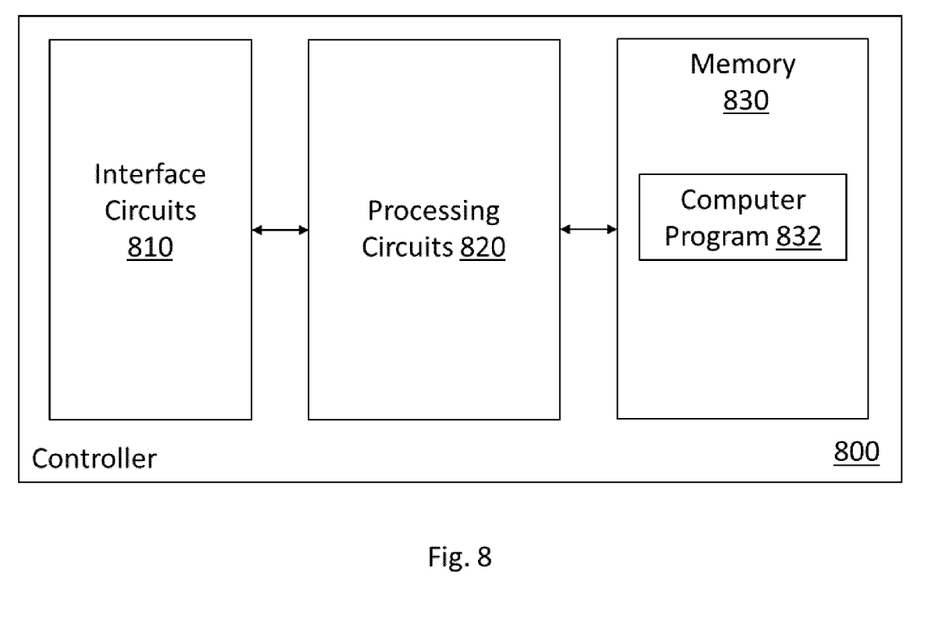
FIG. 8 shows an exemplary embodiment of a controller.

FIG. 8 shows an exemplary embodiment of a controller 800 which is configured to calculate, based on relative transmission timing requirements between a wireless device of a group of wireless devices and another wireless device of said group of wireless devices, the minimum and maximum relative transmission timing relation between a reference wireless device out of said group of wireless devices and each of the wireless device out of said group of wireless devices, and to initiate transmission of the minimum and maximum relative transmission timing relations of each of the wireless devices out of said group of wireless devices to a scheduler in the wireless communication system. According to one embodiment, the controller 800 may comprise a processor or processing circuit 820 and a memory 830, said memory containing instructions 832 executable by said processor 820, whereby said controller 800 is to operative to calculate, based on relative transmission timing requirements between a wireless device of a group of wireless devices and another wireless device of said group of wireless devices, the minimum and maximum relative transmission timing relation between a reference wireless device out of said group of wireless devices and each of the wireless device out of said group of wireless devices, and to initiate transmission of the minimum and maximum relative transmission timing relations of each of the wireless devices out of said group of wireless devices to a scheduler in the wireless communication system. The controller may further comprise interface circuits 810 via which the controller 800 may receive the relative transmission timing requirements from the wireless devices. Further the interface circuits 810 may be adapted to initiate transmission of the minimum and maximum relative transmission timing relations of each of the wireless devices out of said group of wireless devices to a scheduler in the wireless communication system.

According to one embodiment the step of initiate transmission of the minimum and maximum relative transmission timing relations comprises the step of sending, e.g. via the interface circuits 810, to each wireless device out of said group of wireless devices the minimum and maximum relative transmission timing relations of said wireless devices.

According to a further embodiment, the step of initiate transmission of the minimum and maximum relative transmission timing relations comprises the step of sending, e.g. via the interface circuits 810, to said scheduler, the minimum and maximum relative transmission timing relations of each of the wireless devices out of said group of wireless devices. The minimum and maximum relative transmission timing relations of each of the wireless devices of said group of wireless devices may be sent to the scheduler as a scheduling request for scheduling the data transmission for all wireless devices of said group of wireless devices. The minimum and maximum relative transmission timing relations of each of the wireless devices of said group of wireless devices may be comprised in an information element of said scheduling request and wherein the information element further comprises the identity of the reference wireless device.

According to a further embodiment, the step of initiate transmission of the minimum and maximum relative transmission timing relations comprises the step of sending, e.g. via the interface circuits 810, to a master wireless device of said group of wireless devices, the minimum and maximum relative transmission timing relations of each of the wireless devices of said group of wireless devices It is to be understood that the structure as illustrated in FIG. 8 is merely schematic and that the Controller 800 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated.

Figure 9:
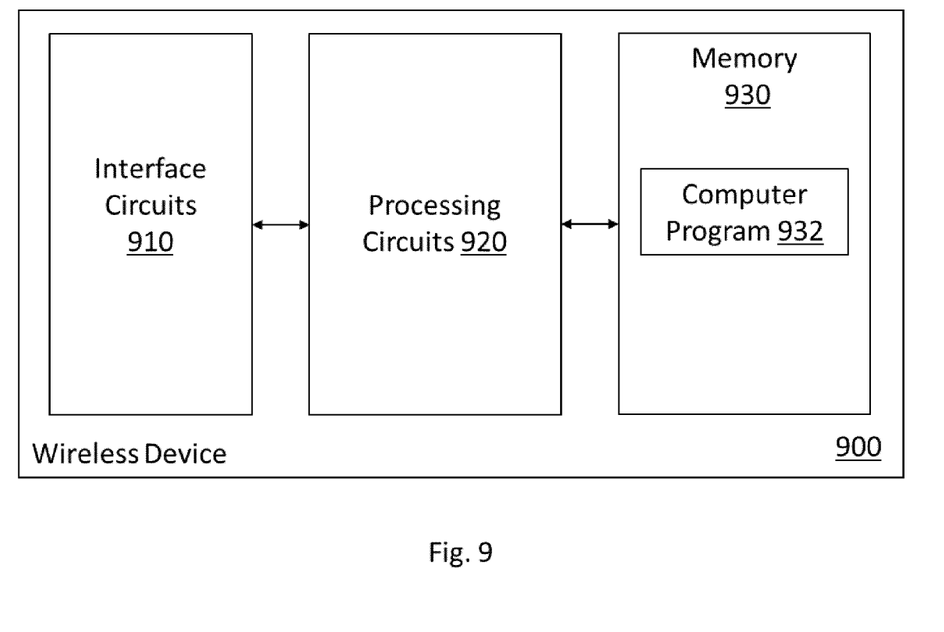
FIG. 9 shows an exemplary embodiment of a wireless device.

FIG. 9 shows an exemplary embodiment of a wireless device 900 out of a group of wireless devices in a wireless communication network, the wireless device 900 is configured to determine a relative transmission timing requirement between said wireless device and another wireless device out of the group of wireless devices, and to send the relative transmission timing requirement to a controller in the wireless communication network for determining a relative transmission timing relation between a reference wireless device out of the group of wireless devices and said wireless device. According to one embodiment, the wireless device 900 may comprise a processor or processing circuit 920 and a memory 930, said memory containing instructions 932 executable by said processor 920, whereby said controller 900 is operative to determine a relative transmission timing requirement between said wireless device 900 and another wireless device out of the group of wireless devices, and to send, e.g. via interface circuits 910, the relative transmission timing requirement to a controller in the wireless communication network for determining a relative transmission timing relation between a reference wireless device out of the group of wireless devices and said wireless device.

According to a further embodiment, the wireless device 900 is further configured to receive, e.g. via the interface circuits 910, the relative transmission timing relation between the reference wireless device out of the group of wireless devices and said wireless device, and to send, e.g. via the interface circuits 910, a scheduling request to a scheduler in the wireless communication network, wherein the scheduling request comprises the relative transmission timing relation between the reference wireless device out of the group of wireless devices and said wireless device.

According to a further embodiment, the wireless device is further configured to receive, e.g. via the interface circuits 910, the relative transmission timing relations between the reference wireless device out of the group of wireless devices and all wireless devices of said group of wireless devices. This embodiment further comprises the step of sending, e.g. via the interface circuits 910, a scheduling request to a scheduler in the wireless communication network, wherein the scheduling request comprises the relative transmission timing relation between the reference wireless device out of the group of wireless devices and all wireless devices of said group of wireless devices.

It is to be understood that the structure as illustrated in FIG. 9 is merely schematic and that the wireless device 900 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated.

Figure 10:
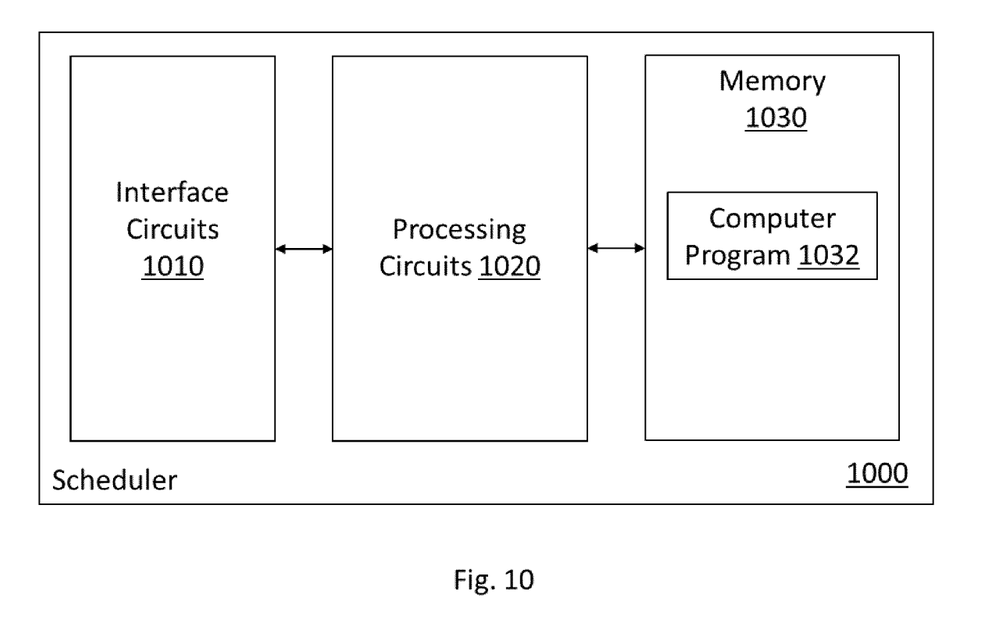
FIG. 10 shows an exemplary embodiment of a scheduler.

FIG. 10 shows an exemplary embodiment of a scheduler 1000 for scheduling data transmission between at least one wireless devices out of a group of wireless devices and a wireless communication system, the scheduler is configured to schedule the data transmission to or from said at least one wireless device out of the group of wireless devices based on an indicated relative transmission timing relation between a reference wireless device out of the group of wireless devices and said at least one wireless device out of the group of wireless devices in response to a scheduling request. According to one embodiment the scheduler 1000 may comprise a processor or processing circuit 1020 and a memory 1030, said memory containing instructions 1032 executable by said processor 1020, whereby said scheduler 1000 is operative to schedule the data transmission to or from said at least one wireless device out of the group of wireless devices based on an indicated relative transmission timing relation between a reference wireless device out of the group of wireless devices and said at least one wireless device out of the group of wireless devices in response to a scheduling request. The scheduler 1000 may also comprise interface circuits 1010 which are adapted to received scheduling requests from the controller, from one or all wireless devices.

In a further embodiment the scheduler 1000 is one function of an access point, which could be a eNB or gNB. In the drawings (e.g. in FIGS. 4 to 6) the scheduling request is sent to the access point AP 430, 530, 630. However, it may be possible that the scheduling request is further forwarded to a scheduling function which might be located elsewhere in the network (e.g. in a cloud environment) or which may be located as a function at the base station or access point (eNB or gNB).

It is to be understood that the structure as illustrated in FIG. 10 is merely schematic and that the Scheduler 1000 may actually include further components which, for the sake of clarity, have not been illustrated, e.g., further interfaces. For example, multiple network interfaces could be provided which are configured to allow communication with different types of other nodes. Also, it is to be understood that the storage entity may include further types of program code modules, which have not been illustrated.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or system of cooperating devices. The present invention also concerns computer programs comprising portions of software codes or instructions in order to implement the method as described above when operated by at least one respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

The invention claimed is:

1. A method of scheduling data transmission of a group of wireless devices, in a wireless communication network, comprising:
   determining a relative transmission timing relation between a reference wireless device out of the group of wireless devices and at least one wireless device out of the group of wireless devices; and
   scheduling the data transmission of the at least one wireless device based on the indicated relative transmission timing relation in response to a scheduling request,
   wherein the scheduling request comprises an information element and wherein the information element comprises at least an identity of the reference wireless device, a minimum and a maximum relative transmission timing relation between said reference wireless device and the at least one wireless device out of the group of wireless devices, and
   wherein the minimum and maximum relative transmission timing relation between the reference wireless device and all wireless devices from said group of wireless devices are sent to a master wireless device out of the group of wireless devices,
   sending the minimum and maximum relative transmission timing relation between the reference wireless device and the at least one wireless device to at least another wireless device, wherein the scheduling request is sent by each wireless device out of the group of wireless devices to at least one scheduler in the wireless communication network.

2. The method according to claim 1, wherein the minimum and maximum relative transmission timing relation between the reference wireless device and the at least one wireless device is determined by receiving from each wireless device out of the group of wireless devices a relative transmission timing requirement between said wireless device and another wireless device out of the group of wireless devices, and calculating, based on the received relative transmission timing requirements the minimum and maximum relative transmission timing relation between the reference wireless device and each of the wireless device out of the group of wireless devices.

3. The method according to claim 2, wherein the transmission timing relation between the reference wireless device and the at least one wireless device out of the group of wireless devices is determined by a controller in the wireless communication network, where the scheduling request is sent by the controller to a scheduler in the wireless communication network.

4. The method according to claim 1, wherein the information element in each of the scheduling requests comprises one minimum and one maximum relative transmission timing relation between the reference wireless device and said wireless device out of the group of wireless devices.

5. The method according to claim 1, wherein the scheduling request is sent by said master wireless device out of the group of wireless devices to the scheduler in the wireless communication network, and wherein the information element comprises the minimum and the maximum relative transmission timing relation between the reference wireless device and all wireless devices from said group of wireless devices, wherein said master wireless device out of the group of wireless devices is the reference wireless device, and/or wherein the information element indicates the number of wireless devices in the group of wireless devices.

6. The method according to claim 5, wherein the information element indicates the number of wireless devices in the group of wireless devices.

7. The method according to claim 1, wherein the relative transmission timing relation is a time period or a number of time slots between a communication event of a reference wireless device and a communication event of at least one wireless device in a time division multiplex (TDM) frame.

8. The method according to claim 1, wherein the identity of the reference wireless device is an IP address, MAC address or bearer ID.

9. The method according to claim 1, wherein the scheduling request is an uplink or downlink scheduling request.

10. A controller in a wireless communication network, the controller comprising a processor that is configured to:
   calculate, based on relative transmission timing requirements between a wireless device of a group of wireless devices and another wireless device of said group of wireless devices, the minimum and maximum relative transmission timing relation between a reference wireless device out of said group of wireless devices and each of the wireless device out of said group of wireless devices; and
   initiate transmission of the minimum and maximum relative transmission timing relations of each of the wireless devices out of said group of wireless devices to a scheduler in the wireless communication system,
   wherein the step of initiate transmission of the minimum and maximum relative transmission timing relations comprises the step of sending, to a master wireless device of said group of wireless devices, the minimum and maximum relative transmission timing relations of each of the wireless devices of said group of wireless devices, and wherein a scheduling request is sent by each wireless device out of the group of wireless devices to the scheduler in the wireless communication network.

11. The controller according to claim 10, wherein the step of initiate transmission of the minimum and maximum relative transmission timing relations comprises the step of sending, to each wireless device out of said group of wireless devices the minimum and maximum relative transmission timing relations of said wireless devices.

12. The controller according to claim 10, wherein the minimum and maximum relative transmission timing relations of each of the wireless devices of said group of wireless devices are comprised in an information element of said scheduling request and wherein the information element further comprises the identity of the reference wireless device.

13. The controller according to claim 10, wherein the scheduling request comprises an information element and wherein the information element comprises at least an identity of the reference wireless device, a minimum and a maximum relative transmission timing relation between said reference wireless device and the at least one wireless device out of the group of wireless devices.

14. The controller according to claim 10, wherein the step of initiate transmission of the minimum and maximum relative transmission timing relations comprises the step of sending, to said scheduler, the minimum and maximum relative transmission timing relations of each of the wireless devices out of said group of wireless devices, wherein the minimum and maximum relative transmission timing relations of each of the wireless devices of said group of wireless devices are sent to the scheduler as a scheduling request for scheduling the data transmission for all wireless devices of said group of wireless devices.

* * * * *